May 6, 1958 T. A. MILLER 2,832,990
MOLD OPENER
Filed Oct. 20, 1954
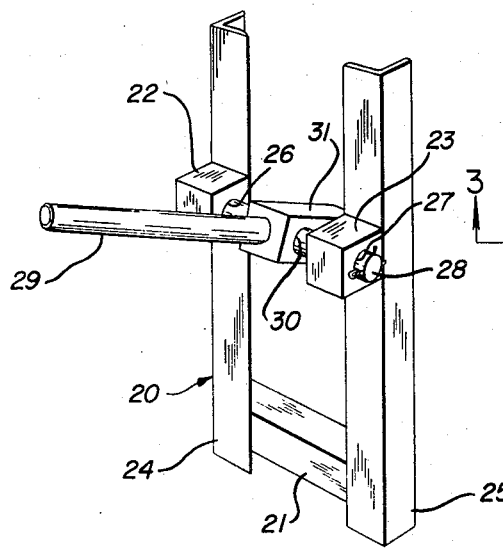
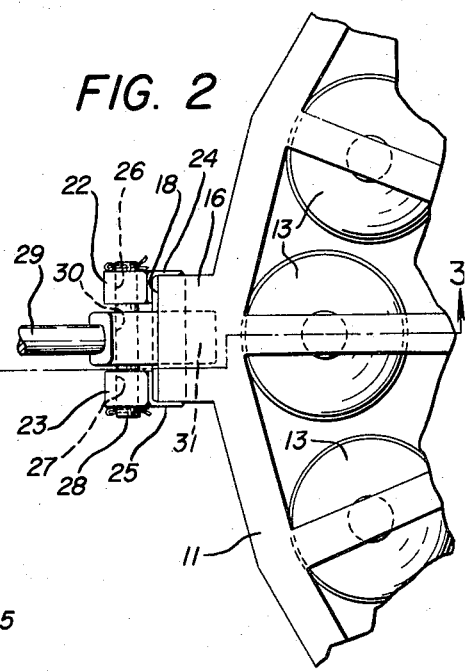
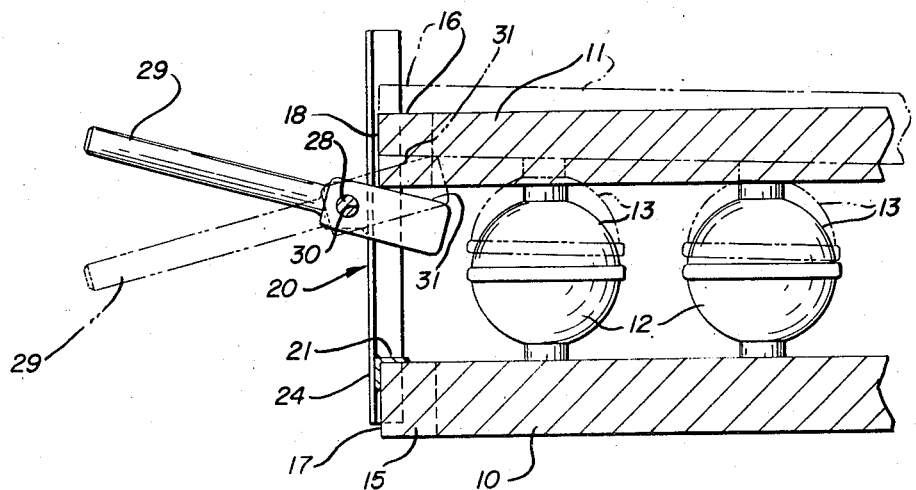
INVENTOR.
THEODORE A. MILLER
BY
Oldham & Oldham
ATTORNEYS

United States Patent Office 2,832,990
Patented May 6, 1958

2,832,990
MOLD OPENER

Theodore A. Miller, Cuyahoga Falls, Ohio

Application October 20, 1954, Serial No. 463,399

2 Claims. (Cl. 18—2)

This invention relates to apparatus for opening molds and is especially useful in opening two part molds used for forming hollow articles from thermoplastic material.

In the manufacture of hollow articles of thermoplastic material it is customary to employ light weight spider-type molds in which a pair of grid mold plates have cooperating mold cavity members mounted therebetween. The grid plates are hinged to each other.

After articles of thermoplastic material have been formed in the mold cavities, it is necessary to use considerable force to separate the molds. This force must be directed accurately or the alignment of the molds will be disturbed.

The present invention has for its object to provide a powerful tool which may be applied to the molds without damaging them.

Other objects are to provide for support of the tool from a broad area of the mold as a fulcrum support while force is applied to the opposite mold plate, to provide for guiding the opposite mold plate in its movement, and to provide a neat light tool for the purpose.

These and other objects will appear from the following description and the accompanying drawings.

Of the drawings:

Figure 1 is a perspective view of the tool of this invention;

Figure 2 is a plan view of a portion of a mold showing the tool applied thereto, portions of the mold and the tool being broken away;

Figure 3 is a sectional view of the mold and the tool, taken on line 3—3 of Figure 2, the closed position of the mold plates being shown in full lines and the raised position of the upper mold plate and the tool being shown in dash and dot lines.

Referring to the drawings, the numeral 10 designates the bottom mold plate and the numeral 11 the top mold plate of a spider-type mold. These plates in their closed condition are well spaced from each other by mold cavities 12 and 13 in alignment with each other. The mold plates have broad faced lugs 15 and 16 of equal width in vertical alignment with each other and terminate in rectilinear parallel faces 17 and 18. At a position opposite the lugs, the mold plates are hinged to one another by hinges (not shown).

It is desirable, in opening the molds to provide for separation of the mold plates at the position of the lugs without exerting any force sidewise of the lugs which might disturb alignment of the mold members. For this purpose, a fulcrum 20 is provided having a base member 21 of right-angled cross-section adapted to rest on the lug 15 with one of its flanges firmly engaging the upper face of the lug and the other flange engaging the vertical face 17 of the lug. Secured to base member, as by welding are a pair of vertically disposed members 24 and 25 also of right-angled cross-section, arranged to engage about the side faces of lugs 15 and 16 and to guide the lug 16 during the mold opening operation. One flange of each vertical member engages the end face 18 of the lug 16, while the other flanges thereof engage about the side faces of the lug. A pair of lugs 22 and 23 are secured, as by welding, to vertical members 24 and 25 and have horizontally aligned bearing openings 26 and 27 for a fulcrum rod 28. A lever 29 is pivotally mounted on fulcrum rod 28 and has a cross-aperture 30 for receiving the rod. One end of the lever 29 is of square cross-section and has a horizontal pry face 31 for engaging the lug 16. The opposite end of the lever is round in cross-section to provide a long handle for applying leverage.

In the operation of opening the mold, the fulcrum member is placed with the horizontal flange of its base member on the upper face of mold lug 15 and the vertical flange thereof against face 17 of the lug. The parallel flanges of the vertical members of the fulcrum are positioned about lugs 15 and 16 to hold them in alignment. The lever 29 is then swung about the fulcrum bar to engage its flat face 31 with the lower face of lug 16 and by pressure on the handle exerted downwardly, the mold plates 10 and 11, are forced apart while they are held in vertical alignment by the fulcrum.

Variations may be made without departing from the spirit and scope of the invention as it is defined by the following claims.

I claim:

1. Mold opening apparatus for separating a pair of hingedly connected mold plates having aligned mold cavities and aligned projecting lugs opposite their hingedly connected portions, said apparatus comprising a pair of parallel bars having opposed parallel faces spaced from each other by the width of the mold lugs for receiving and guiding said lugs in a mold-opening movement, a cross member secured to said bars for holding them in spaced relation, said cross member having a base surface normal to said parallel bars for seating on a face of one of said mold lugs and providing with said parallel bars a pocket engaging the top and end and both side faces of said one of said mold lugs, a fulcrum bar rotatively mounted on said parallel bars with its axis parallel to said base surface, and a lever mounted on said fulcrum bar between said parallel bars for engaging the opposed mold lug and prying the lugs apart while both lugs are held in alignment by said parallel bars.

2. Mold opening apparatus for separating a pair of hingedly connected mold plates having aligned mold cavities and aligned projecting lugs opposite their hingedly connected portions, said apparatus comprising a pair of parallel bars of right angled cross section having opposed parallel inner faces spaced from each other by the width of the mold lugs for receiving and guiding said lugs in a mold-opening movement, a cross member of right angled cross section secured to said bars for holding them in spaced relation, said cross member having an inner face providing a base surface normal to said parallel bars for seating on a face of one of said mold lugs and providing with said parallel bars a pocket engaging the top and end and both side faces of said one of said mold lugs, a fulcrum bar rotatively mounted on said parallel bars with its axis parallel to said base surface, and a lever mounted on said fulcrum bar between said parallel bars for engaging the opposed mold lug and prying the lugs apart while both lugs are held in alignment by said parallel bars.

References Cited in the file of this patent

UNITED STATES PATENTS

| 1,219,948 | Kaehler | Mar. 20, 1917 |
| 1,364,840 | Glennon et al. | Jan. 4, 1921 |
| 1,512,913 | Dugan | Oct. 28, 1924 |
| 1,543,661 | Baumbach | June 30, 1925 |
| 1,609,701 | Doty | Dec. 7, 1926 |
| 1,716,792 | Nelson | June 11, 1929 |

FOREIGN PATENTS

| 273,018 | Great Britain | June 27, 1927 |
| 804,426 | Germany | Apr. 23, 1951 |